United States Patent
M et al.

(10) Patent No.: US 10,066,273 B2
(45) Date of Patent: Sep. 4, 2018

(54) CANE PREPARATION UNIT AND METHOD OF OPERATION

(71) Applicant: ABB RESEARCH LTD, Zurich (CH)

(72) Inventors: Arun Kumar M, Mayiladuthurai (IN); Babji Buddhi Srinivasa, Bangalore (IN); Abhijit Badwe, Pune (IN)

( * ) Notice: Subject to any disclaimer, the term of this patent is extended or adjusted under 35 U.S.C. 154(b) by 788 days.

(21) Appl. No.: 14/041,138

(22) Filed: Sep. 30, 2013

(65) Prior Publication Data

US 2014/0027547 A1    Jan. 30, 2014

Related U.S. Application Data

(63) Continuation of application No. PCT/IB2011/003129, filed on Dec. 22, 2011.

(30) Foreign Application Priority Data

Mar. 31, 2011   (IN) ............................ 1047/CHE/2011

(51) Int. Cl.
   C13B 5/02        (2011.01)
   C13B 5/00        (2011.01)
   (Continued)

(52) U.S. Cl.
   CPC ................. C13B 5/02 (2013.01); C13B 5/00 (2013.01); C13B 5/08 (2013.01); C13B 10/025 (2013.01);
   (Continued)

(58) Field of Classification Search
   CPC ........... C13B 5/02; C13B 5/00; C13B 10/025; C13B 5/08; G06Q 10/04; G05B 15/02;
   (Continued)

(56) References Cited

U.S. PATENT DOCUMENTS 3,199,793 A * 8/1965 Sabi ...................... B65G 43/08
                                                              100/155 R
4,816,075 A * 3/1989 Gruenewald ............. C13B 5/04
                                                              127/2
(Continued)

FOREIGN PATENT DOCUMENTS

CN       1567107 A     1/2005
CN       101344065 A   1/2009

OTHER PUBLICATIONS

Zhang, S. (Jul. 2010). Model predictive control of operation efficiency of belt conveyor. In 2010 proceedings of the 29th Chinese control conference (pp. 1854-1858). IEEE.*

(Continued)

*Primary Examiner* — Kenneth M Lo
*Assistant Examiner* — David J Wynne
(74) *Attorney, Agent, or Firm* — Barnes & Thornburg LLP (57) ABSTRACT

Operation of a cane preparation unit is disclosed which can include providing a working range for at least one operating variable for a plurality of carriers of a cane preparation unit, estimating energy consumed corresponding to a first plurality of set points for the at least one operating variable, selecting one or more first set points corresponding to reducing (e.g., minimizing) energy consumed for the at least one operating variable as use set points, and operating the cane preparation unit at the use set points.

7 Claims, 4 Drawing Sheets

(51) Int. Cl.
*C13B 5/08* (2011.01)
*C13B 10/02* (2011.01)
*G05B 15/02* (2006.01)
*G06Q 10/04* (2012.01)

(52) U.S. Cl.
CPC ............ *G05B 15/02* (2013.01); *G06Q 10/04* (2013.01); *G05B 2219/32021* (2013.01); *Y02P 70/161* (2015.11); *Y02P 80/114* (2015.11); *Y02P 90/205* (2015.11); *Y02P 90/28* (2015.11)

(58) Field of Classification Search
CPC ......... G05B 2219/32021; Y02P 90/205; Y02P 90/28; Y02P 70/161
USPC .................................................. 700/112, 113
See application file for complete search history.

(56) References Cited

U.S. PATENT DOCUMENTS

| | | | | |
|---|---|---|---|---|
| 5,285,887 | A * | 2/1994 | Hall ...................... | B65G 43/10 198/460.1 |
| 6,336,055 | B1 | 1/2002 | Cho | |
| 6,630,672 | B1 * | 10/2003 | Brotherton ......... | G01N 21/3563 250/338.5 |

OTHER PUBLICATIONS

Danielle M Lorimer et al: "Industrial strategies to help reduce energy consumption: A holistic approach for cement producers", Cement Industry Technical Conference, 2010 IEEE—IAS/PCA 52nd, IEEE, Piscataway, NJ, USA, Mar. 28, 2010 (Mar. 28, 2010), pp. 1-7, XP031679332, ISBN: 978-1-4244-6407-4.

Luis Alberto Paz Suarez et al: "Computationally efficient process control with neural networkbased predictive models", Neural Networks, 2009. IJCNN 2009. International Joint Conference on, IEEE, Piscataway, NJ, USA, Jun. 14, 2009 (Jun. 14, 2009), pp. 2990-2997, XP031498167, ISBN: 978-1-4244-3548-7.

Ozkocak T et al: "Maceration control of a sugar cane crushing mill", American Control Conference, 2000. Proceedings of the Jun. 28-30, 2000, 2000, Piscataway, NJ, USA,IEEE, vol. 4, Jun. 28, 2000 (Jun. 28, 2000), pp. 2255-2259, XP010517676, ISBN: 978-0-7803-5519-4.

Romano Desantis M Ed—Institute of Electrical and Electronics Engineers: "The Implementation of a Continuous Controller via a Discrete Valued Controller", Proceedings of the American Control Conference. Boston, Jun. 26-28, 1991; [Proceedings of the American Control Conference], New York, IEEE, US, Jun. 26, 1991 (Jun. 26, 1991), pp. 324-330, XP031430023, ISBN: 978-0-87942-565-4.

Yamaguchi K et al: "Instrumentation and Man-Machine Interfaced Computing Control System for Sugar Refinery", IEEE Transactions on Industrial Electronics and ControlInstrumentation, IEEE, New York, N. Y., N/A, vol. IECI-11, No. 3, Aug. 1, 1976 (Aug. 1, 1976), pp. 223-229, XP011179110, ISSN: 0018-9421.

Zhang Shirong: "Model predictive control of operation efficiency of belt conveyor", Control Conference (CCC), 2010 29th Chinese, IEEE, Piscataway, NJ, USA, Jul. 29, 2010 (Jul. 29, 2010), pp. 1854-1858, XP031754537, ISBN: 978-1-4244-6263-6.

European Patent Office, International Search Report for PCT/IB2011/003129, dated Mar. 29, 2012, 4 pages.

European Patent Office, Written Opinion of the International Search Authority for PCT/IB2011/003129, dated Mar. 29, 2012, 5 pages.

European Patent Office, International Preliminary Report on Patentability for PCT/IB2011/003129, dated Oct. 1, 2013, 6 pages.

* cited by examiner

FIG. 4

CANE PREPARATION UNIT AND METHOD OF OPERATION

RELATED APPLICATIONS

This application claims priority as a continuation application under 35 U.S.C. § 120 to PCT/IB2011/003129, which was filed as an International Application on Dec. 22, 2011 designating the U.S., and which claims priority to Indian Application 1047/CHE/2011 filed in India on Mar. 31, 2011. The entire contents of these applications are hereby incorporated by reference in their entireties.

TECHNICAL FIELD

The present disclosure relates generally to sugar plants and, for example, to optimized operation of a cane preparation unit of the sugar plant.

BACKGROUND INFORMATION

A sugar plant can include a cane preparation unit or section, where sugarcane from stock/trucks are transferred to a series of cane carriers which carry the cane to a first mill chute for cane processing. The cane preparation unit is used to increase the cane density by cutting it into smaller pieces referred as cane chips and tearing the cane chips into shreds with no extraction of juice.

The cane carriers include a chopper having knives to cut the cane into smaller pieces, and a shredder to tear the cane chips into shreds. The output from the shredder is sent to the first mill chute and then onto the conveyers to the subsequent mills. The function of the cane preparation unit is to implement a uniform feed of cane to the first crushing mill in the presence of severe loading disturbances which are otherwise present in an absence of the cane preparation unit.

However, the current operation of the cane preparation unit overlooks an energy minimization aspect. In existing cane preparation units, the operators adjust set points for the speeds of the carrier motors based on their experience and the level of the cane in the carriers. It may be noted here that the speed of the last carrier is decided by the level of cane in the carrier, level of cane in the first mill chute, and the first mill chute load. The speeds of the rest of the carriers are decided based on the level of cane in the carrier, speed of the next carrier and knives/shredder overloads (if any). With these different variables, it can be difficult for the operators to optimize for all variables. Therefore the operators mostly focus on reducing the stoppages due to imbalance between the amount of cane crushed in the first mill and that is being conveyed through the carriers to the first mill chute. Minimization of energy consumption is not accounted for in this process.

Therefore, to optimize the operation of the cane preparation unit and reduce the operating costs of the sugar plants, it would be desirable to minimize energy consumption in the cane preparation unit.

SUMMARY

A method is disclosed for operating a cane preparation unit, the method comprising: providing a working range for at least one operating variable for a plurality of carriers of a cane preparation unit; estimating energy consumed by the cane preparation unit when operated with a first plurality of set points for the at least one operating variable; generating one or more first set points, to reduce energy consumed for the at least one operating variable, as use set points; and operating the cane preparation unit at the use set point.

A system is disclosed comprising: an energy optimizing unit configured for: providing a working range for at least one operating variable for a plurality of carriers of a cane preparation unit; estimating energy consumed by the cane preparation unit when operated with a first plurality of set points for the at least one operating variable; generating one or more first set points, to reduce energy consumed for the at least one operating variable, as use set points; and outputting the use set points for operating a cane preparation unit.

A cane preparation unit is disclosed comprising: a plurality of carriers coupled to each other, and configured for carrying out a predetermined function based on at least one operating variable; and an energy optimizing unit for generating use set points for each of the plurality of carriers based on reducing energy consumed for the at least one operating variable for the cane preparation unit.

BRIEF DESCRIPTION OF THE DRAWINGS

Other features, aspects, and advantages disclosed herein will become better understood when the following detailed description of exemplary preferred embodiments is read with reference to the accompanying drawings in which like characters represent like parts throughout the drawings, wherein.

DETAILED DESCRIPTION

A method is disclosed for operating a cane preparation unit. The method includes providing a working range for at least one operating variable for a plurality of carriers of a cane preparation unit, estimating energy consumed corresponding to a first plurality of set points for the at least one operating variable, selecting one or more first set points corresponding to minimum energy consumed for the at least one operating variable as use set points, and operating the cane preparation unit at the use set points.

In an exemplary aspect, a cane preparation unit is disclosed which includes an energy minimizing unit to implement the method described herein. An exemplary cane preparation unit includes a plurality of carriers coupled to each other, and configured for carrying out a predetermined function based on at least one operating variable and the energy optimizing unit for generating use set points for each of the plurality of carriers based on minimum energy consumed for the at least one operating variable for operating the cane preparation unit.

As used herein and in the claims, the singular forms "a," "an," and "the" include the plural reference unless the context clearly indicates otherwise.

Exemplary aspects disclosed herein provide an overall optimal control strategy for a cane preparation unit of sugar plants that issue use set points to different operating carriers associated with the cutter, shredder, and transporter which can minimize energy consumption in addition to fulfilling other known control features. The known control features of a cane preparation unit include but are not limited to ensuring uniform feed (e.g., constant chute level in a first crushing mill), ensuring smooth acceleration, and avoiding knives/shredder overloads.

Currently for the operation of different carriers, the operator has pre-defined static values as shown below in Table 1 that the operator can use as a general guideline for applying the set points for the different carriers of the cane preparation unit. However, using these static values, currently the energy optimization of the cane preparation unit as a whole is not accounted for. Aspects disclosed herein can address this drawback by providing an energy optimizing unit as explained herein.

Cane Preparation Equipment Installed Power

TABLE 1

Cane Preparation Equipment Installed Power

| | Specific Power [kW/tfh] | Tip Speed [m/s] | Tip Clearance [mm] |
|---|---|---|---|
| Leveller knives | 6 | 50 | 1000 |
| First knives | 15 | 60 | 150 |
| Second knives (heavy duty) | 30 | 60 | 50 |
| Shredder | 60 | 100 | |
| Total | 111 | | |

Source: Hugot Handbook of Cane Sugar Engineering

Figure 1:
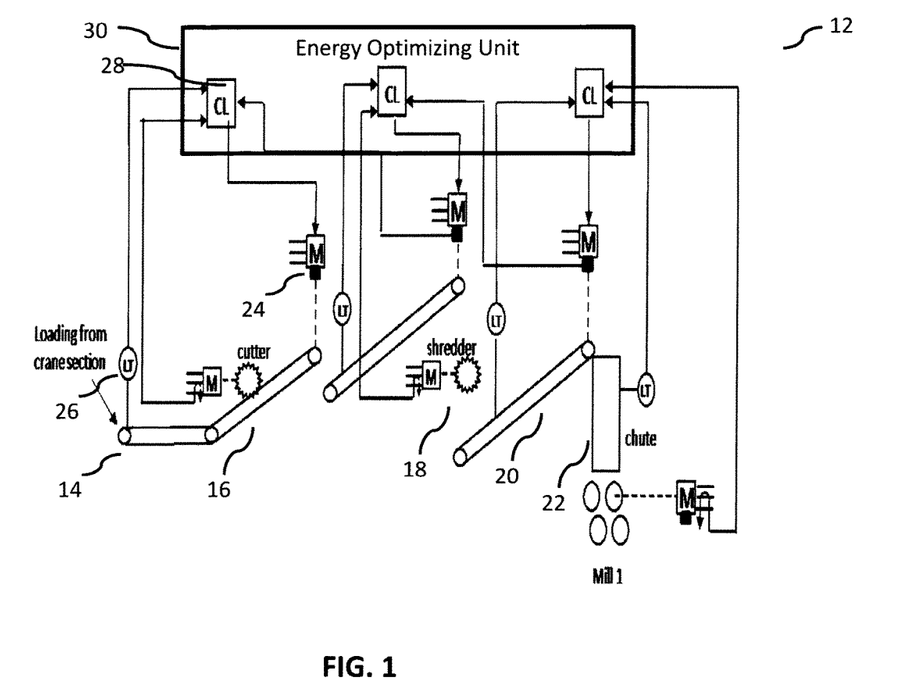
FIG. 1 is a schematic representation of an exemplary cane preparation unit according to an embodiment of the invention.

FIG. 1 is a schematic representation of a cane preparation unit 12 according to an exemplary embodiment. The cane preparation unit 12 receives cane from a cane loading section indicated generally by reference numeral 14. From there the cane is taken to a cutter 16 through a conveyer belt for cutting the cane into a desired size. The cut cane pieces are taken to a shredder 18 for shredding the desired sized cane into shredded cane pieces. Then a transporter 20 conveys the shredded cane pieces to a chute 22 of a first mill for further processing.

The cutter section 16, shredder section 18 and the transporter 20 are generally referred to herein as carriers. The carriers can use a conveyer belt mechanism for moving the output material from one carrier to the next. Each carrier can be associated with a carrier motor indicated by reference numeral 24, such as an induction motor, the speed of which can be monitored by a sensor for example a tachometer and sent as an input to a control logic (CL) unit 28.

The level of cane (LT) as indicated by reference numeral 26 in each carrier can also be monitored and sent as an input to the control logic unit 28. As shown in FIG. 1 each of the carriers may be associated with a control logic unit, together encompassed in the energy optimizing unit 30. The energy optimizing unit 30 issues can use set points to the carrier motors to operate the cane preparation unit 12 such that it will consume minimum energy while meeting the objectives of maintaining uniform feed in the chute 22 of the first mill and other operational objectives. An exemplary method employed by the energy optimizing unit 30 to achieve these objectives is described in more detail herein.

Figure 2:
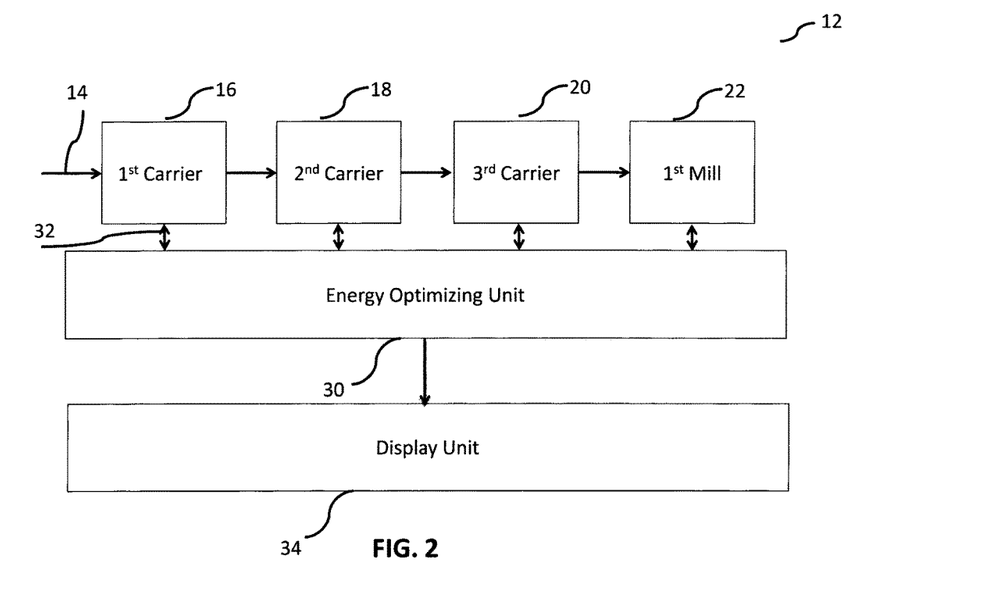
FIG. 2 is a block diagram representation of the exemplary cane preparation unit of FIG. 1.

FIG. 2 is a block diagram representation for the exemplary schematic of the cane preparation unit of FIG. 1, where the cane preparation unit 12 includes a plurality of carriers 16, 18, 20 for respective predetermined functions such as those described herein, wherein the $1^{st}$ carrier 16 functions as a carrier for a cutter, a $2^{nd}$ carrier functions as a carrier for a shredder 18, and a $3^{rd}$ carrier functions as a transporter 20 for conveying shredded cane pieces to a collector unit or chute 22 for the first mill. The cane preparation unit includes an exemplary energy optimizing unit 30 disclosed herein for generating use set points based on minimum energy consumed for at least one operating variable for the cane preparation unit. The at least one operating variable as referred to herein includes but is not limited to a cutter level indicator, a cutter speed indicator, a cutter output size indicator, a shredder level indicator, a shredder speed indicator, a shredder output indicator, a transporter level indicator, a transporter speed indicator, and a final output level indicator, and combinations thereof. In an exemplary implementation, the speed set points have been used as operating variables, and the objective function has been designed to minimize an error in the chute level of first crushing mill and obtain minimum speed set points for the carriers that leads to an energy optimized solution. It will be understood by those skilled in the art that the use sets are also generated for all of these operating variables or a group of these operating variables in different embodiments, and are not limited to one operating variable.

To obtain the use set points, the energy optimizing unit 30 is configured for receiving a working range for the chosen one or more operating variables as an input. The working range may be provided by an operator or may be predefined inputs for the energy optimizing unit. The energy optimizing unit estimates the energy consumed corresponding to a first plurality of set points in the working range of the chosen one or more operating variables. The energy optimizing unit then selects one or more first set points corresponding to reducing (e.g., minimum) energy consumed for the at least one operating variable as use set points. The use set points are then applied to the plurality of carriers for the chosen one or more operating variables.

In certain embodiments where more than one operating variable is considered, the working range for each of the operating variables can serve as an input for the energy optimizing unit. The reference numeral 32 indicates the communication and control instruction flow between the energy optimizing unit 30 and the different carriers 16-20 and the first mill chute 22. The communication flow includes the inputs in the form of motor speed values and material level for each carriers, and control instructions can include the use set points for motor speeds for each carrier.

The energy optimizing unit 30 may also be pre-programmed or manually set for a sampling time to receive the use set points and other operating variables at periodic intervals during the operation of the cane preparation unit 12 to estimate the reduced (e.g., minimum) energy consumed and correspondingly generate the new use set points.

In some implementations the energy optimizing unit may dynamically monitor the current one or more operating variables, which would also include the use set points, and periodically or continuously estimate the energy consumed for current operating variables, and generate second set points corresponding to the minimum energy consumed. In case the second set points are different then first set points, then the energy optimizing unit selects the second set points as the new use points and applies them for the cane preparation unit. In case if both first and second set points are same then no change is made for set points for the cane preparation unit.

It will be appreciated by those skilled in the art, that the energy optimizing unit may be a distinct component or may be integrated as or with an existing controller for the cane preparation unit or a central control unit for the sugarcane plant.

The cane preparation unit 12 may further include a display unit 34 for displaying the use set points and the energy consumed by the cane preparation units at the use set points. The display unit may be in the form of a graphical user interface. Further the display unit may be integrated with the energy optimizing unit 30 in one exemplary implementation. The data for the use set points over a period of time and the corresponding energy consumed may be stored in an appropriate storage medium for archival and retrieval purposes and for the purpose of generating reports and further analysis of such data.

The energy optimizing unit can realize an objective of minimizing the energy consumed in the cane preparation unit together with maintaining uniform feed and avoidance of overloading of knives/shredders and ensuring smooth acceleration for the different carriers. This can be achieved by using a model based optimal control framework for the cane preparation unit as explained herein.

The exemplary model as described herein includes (e.g., consists of) dynamic models for carriers including (e.g., consisting of) a speed or speeds of the motors as the input(s) and level of the material in that section as the output. Since all the cane carriers and the cane preparation unit are arranged in series, the level of the material and the speed of carrier influences the level of the next carrier. For example, the chute level of the first mill is influenced by the speeds and cane level in the preceding carriers before the first mill.

These models, in one example are built based on the dynamic response data including both input and output data collected from the tests carried out in the sugarcane plant. These dynamic models can be expressed in the form of transfer functions of the first order plus dead time or state space models, as for example given below:

Transfer function model:

$$Yn+1 = (1-T/Tc)Yn + KpT\ Un-k/Tc$$

Where Yn+1 & Yn are the outputs at sampling instants n+1 & n respectively
Un is the input at the nth sampling instant;
T is the sampling period;
Tc is the time constant of the process;
Kp is the process gain; and
K is the dead time of the process expressed as the number of sampling periods.

The state space model for the cane preparation system can then be expressed as:

$$dX/dt = AX + BU$$

$$Y = CX + DU$$

Where X is the vector of the states (material level in carrier) of the system in the carriers and 1st mill;
A, B, C and D are matrices containing parameters of the model;
U is the vector of the inputs such as the speeds of the motors; and
Y is the measured outputs of the process such as the levels of the cane in the carriers and the 1st mill (all the levels may not be available as measurements).

These identified dynamic models are for example used in the control strategy to calculate optimized set points for the speeds of the motors according to the method as described by the objective function expression as given herein below:

$$\min_d \sum_{j=0}^{NP-1} [y_{sp}(k+j) - \hat{y}(k+j)]^2 + \sum_{j=0}^{Nc-1} d(k+j)^T W1 d(k+j) + \sum_{j=0}^{Nc-1} [d(k+j) - d(k+j-1)]^T W2 [d(k+j) - d(k+j-1)]$$

subject to $$X(k+1) = f(X(k)d)$$

$$\hat{y}(k) = g(X(k)d)$$

$$d_{min} \le d \le d_{max}$$

where $$d = \begin{bmatrix} speed1 \\ speed2 \\ \vdots \\ speedm \end{bmatrix};$$

$$W1 = \begin{bmatrix} w11 & 0 & \ldots & 0 \\ 0 & w12 & \ldots & 0 \\ \vdots & \vdots & \ddots & \vdots \\ 0 & 0 & \ldots & w1m \end{bmatrix};$$

$$W2 = \begin{bmatrix} w21 & 0 & \ldots & 0 \\ 0 & w22 & \ldots & 0 \\ \vdots & \vdots & \ddots & \vdots \\ 0 & 0 & \ldots & w2m \end{bmatrix};$$

$$X = \begin{bmatrix} x1 \\ x2 \\ \vdots \\ x_n \end{bmatrix};$$

$\hat{y}$ = firstmill chute level;
p = predictionhorizon;
Nc = control horizon

It can be assumed that the cane preparation system has 'm' carriers each driven by a motor. The first term of the objective function reduces (e.g., minimizes) deviations in the first mill chute level to ensure uniform feed. The second term corresponds to reducing (e.g., minimizing) the speed of the cane carrier motors to ensure optimized use of energy, based on the assumption that the carrier/conveyor system is a constant torque-variable speed load as is widely known in literature. The third term of the objective function can provide and/or ensure smooth acceleration.

$W_1$ and $W_2$ are appropriate weighting matrices to establish trade-offs. These constraints provide the state-space model of the system which predicts the first mill chute level, X is the state vector whose dimension n depends upon the order of the system and time-delays. The state space model may be linear or non-linear, and can encompass all types of models developed to predict first mill chute level. The knives/shredder load limitations are translated into appropriate constraints on the decision variables d. The solution of the optimization problem gives set points, for example speed set points, to individual motor controllers for the carriers for smooth and safe operation of the carriers.

The model also advantageously allows the energy optimizing unit to detect or forecast any possibilities of chute overflows/trips in the near future and take appropriate control action.

Figure 3:
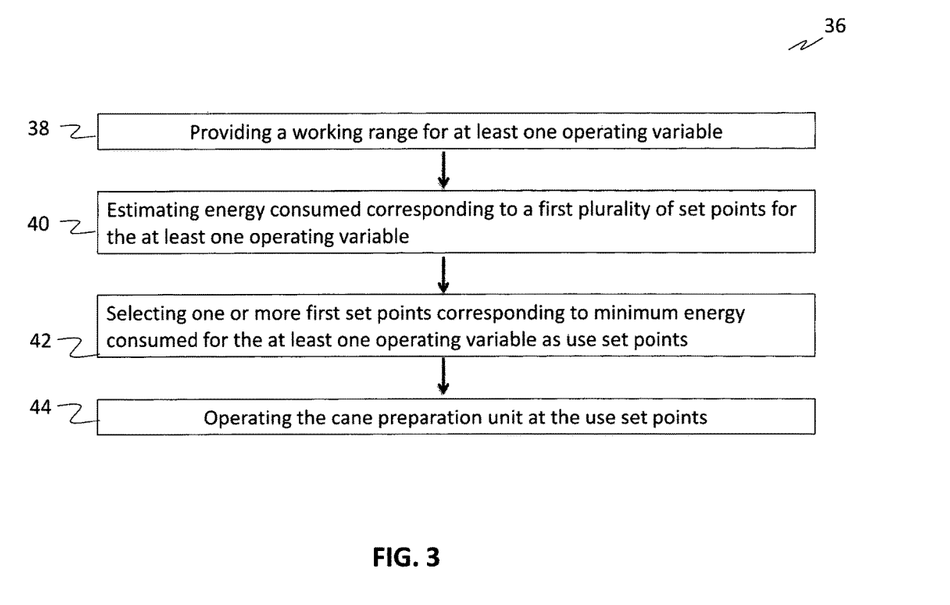
FIG. 3 is an exemplary flowchart representation for an exemplary method for operating a cane preparation unit.

Another exemplary aspect disclosed herein relates to a method for operating a cane preparation unit as represented in the flowchart 36 of FIG. 3. The exemplary method includes at step 38 for providing a working range for at least one operating variable. The examples of operating variables as also mentioned in reference to FIG. 1 include but are not limited to one or more of the following: a cutter level indicator, a cutter speed indicator, a cutter output size indicator, a shredder level indicator, a shredder speed indicator, a shredder output indicator, a transporter level indicator, a transporter speed indicator, and a final output level indicator, and combinations thereof.

The method at step involves a step 40 for estimating energy consumed corresponding to a first plurality of set points for the at least one operating variable. At step 42 one or more first set points are selected corresponding to reduced, or minimum, energy consumed for the at least one operating variable as use set points. The cane preparation unit can then be operated at the use set points as indicated by step 44.

Figure 4:
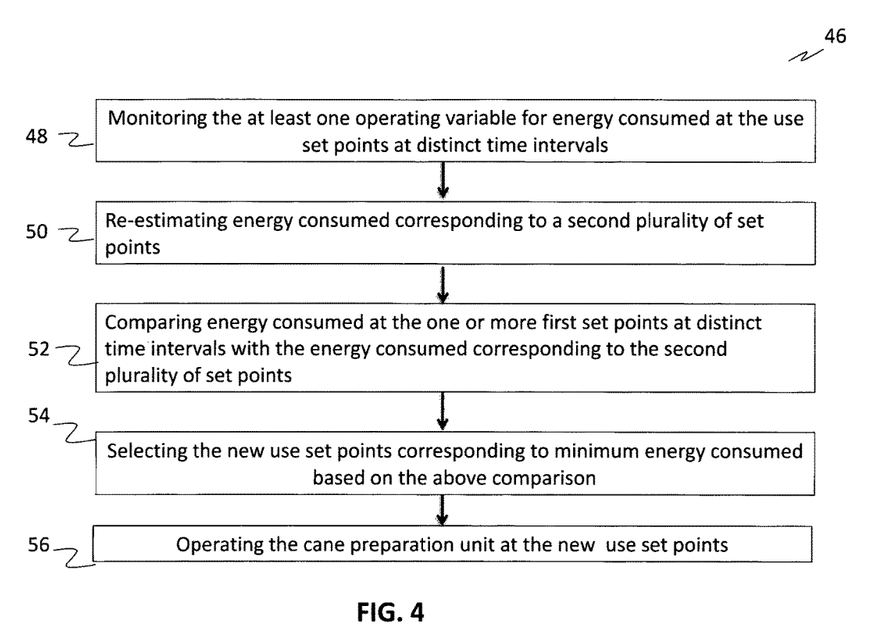
FIG. 4 is an exemplary flowchart representation for further steps for the exemplary method of FIG. 3 for operating the cane preparation unit.

The flowchart 46 of FIG. 4 represents further steps for the exemplary method for operating the cane preparation unit. The method includes a step 48 for monitoring the at least one operating variable for energy consumed at the use set points at distinct time intervals, and a step 50 for re-estimating energy consumed corresponding to a second plurality of set points.

At step 52 it is checked if the second plurality of set points provide a more optimized operating solution. At step 54 one or more second set points may be selected as new use set points corresponding to reduced (e.g., minimum) energy consumed based on the above step. And again, the cane preparation unit is operated at the new use set points as indicated at step 56.

In one exemplary embodiment, the first set points and the second set points are generated by a model for a cane preparation unit. As explained earlier, in one example the one or more second set points are the same as one or more first set points, and no change is required in the operation of the cane preparation unit.

Thus, the energy optimizing unit and the underlying method may be implemented as a tool integrated with a system for operating a sugar plant to provide an optimized control solution for operating the cane preparation unit that achieves energy optimization and known objectives, and thus can improve efficiency and reduce operating costs for the sugar plant.

While only certain features of the invention have been illustrated and described herein, many modifications and changes will occur to those skilled in the art. It is, therefore, to be understood that the appended claims are intended to cover all such modifications and changes as fall within the true spirit of the invention.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

We claim:

1. A method for operating a cane preparation unit with an energy optimizing unit, wherein the cane preparation unit includes a plurality of carriers coupled to each other for receiving cane from a cane loading section, cutting the received cane into a desired size, shredding the desired size cane into shredded cane pieces and conveying the shredded pieces to a chute of a first mill, wherein each of the carriers is associated with a carrier motor, the method comprising:
   receiving, by the energy optimizing unit, a working range for at least one operating variable for the plurality of carriers of the cane preparation unit;
   estimating, by the energy optimizing unit, energy consumed by the cane preparation unit when operated with a first plurality of set points in the received working range for the at least one operating variable;
   selecting, by the energy optimizing unit, one or more first set points as use set points for the at least one operating variable based on the estimation of energy consumed by the cane preparation unit, obtained with an objective function to reduce energy consumed for the at least one operating variable, wherein the objective function includes terms to reduce deviations in a first mill chute level for maintaining uniform feed and to reduce the speed of at least one of the carrier motors, and wherein the use set points correspond to reduced energy consumed in the operation of the cane preparation unit; and
   operating the cane preparation unit at the use set points for the at least one operating variable.

2. The method of claim 1, wherein the at least one operating variable is selected from a group consisting of: a cutter level indicator, a cutter speed indicator, a cutter output size indicator, a shredder level indicator, a shredder speed indicator, a shredder output indicator, a transporter level indicator, a transporter speed indicator, and a final output level indicator, and combinations thereof.

3. The method of claim 1, comprising:
   monitoring the at least one operating variable for energy consumed at the use set points at distinct time intervals;
   re-estimating energy consumed for a second plurality of set points;
   generating one or more second set points with the objective function, wherein the objective function includes a first term to reduce deviations in a first mill chute level for maintaining uniform feed and a second term to reduce the speed of at least one of the carrier motors, corresponding to a reduced energy consumed at the one or more first set points or the second plurality of set points as new use set points; and
   operating the cane preparation unit at the new use set points.

4. The method of claim 3, wherein the one or more second set points are same as the one or more first set points.

5. The method of claim 1, wherein the plurality of first set points are generated using a model for the cane preparation unit.

6. The method of claim 3, comprising:
   generating the plurality of second set points by a model for the cane preparation unit.

7. A cane preparation unit for a sugarcane processing plant, the cane preparation unit comprising:
   a plurality of carriers coupled to each other and configured for carrying out a predetermined function based on at least one operating variable, wherein each of the plurality of carriers is associated with a carrier motor; and
   an energy optimizing unit for:
   receiving a working range for the at least one operating variable for the plurality of carriers of the cane preparation unit, estimating energy consumed by the cane preparation unit when operated with a first plurality of set points in the received working range for the at least one operating variable, selecting one or more first set points as use set points for the at least one operating variable for each of the plurality of carriers based on the estimation of energy consumed by the cane preparation unit, the first set points obtained with an objective function for reducing energy consumed for the at least one operating variable, wherein the objective function includes terms to reduce deviations in a first mill chute level for maintaining uniform feed and to reduce the speed of at least one of the carrier motors, and wherein the use set points correspond to reduced energy consumed in the operation of the cane preparation unit, and operating the cane preparation unit at the use set points for the at least one operating variable.

\* \* \* \* \*